Patented June 6, 1944

2,350,517

UNITED STATES PATENT OFFICE 2,350,517

PROCESS FOR CONVERTING A CYCLIC ACETAL TO A POLYOLEFIN

Louis A. Mikeska, Westfield, and Erving Arundale, Colonia, N. J., assignors, by mesne assignments, to Jasco, Incorporated, a corporation of Louisiana No Drawing. Application December 7, 1940, Serial No. 369,134

12 Claims. (Cl. 260—681)

The present invention involves a method for the dehydrahydrolysis of cyclic acetals to polyolefinic compounds. The dehydrahydrolysis of cyclic acetals is accomplished by refluxing the cyclic acetal with a dilute acid-acting compound under fractionation conditions, the polyolefin being distilled off as it is formed. The dehydrahydrolysis process consists in the simultaneous hydrolysis of the cyclic acetal to a polyhydric alcohol and the dehydration of said alcohol to a polyolefin.

Diolefins have previously been prepared by such methods as the dehydration of the corresponding glycol or unsaturated alcohol, the dehydrochlorination of the corresponding dichloride or unsaturated chloride and the dehydrogenation of mono-olefinic or paraffinic hydrocarbons. Other methods have also been used, but they are rather involved and uneconomical. For example, dimethylbutadiene has heretofore been prepared by a lengthy procedure involving the formation of pinacol from acetone and the dehydration of the former to the diolefin.

According to the present invention, conjugated polyolefinic compounds, of which the conjugated diolefins are representative, are prepared from hydrocarbon-substituted meta-dioxanes or dioxolanes. The meta-dioxanes are cyclic acetals possessing six-membered rings and having the following general formula:

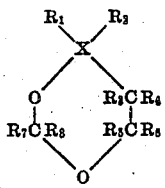

wherein X is a secondary or tertiary carbon atom, and $R_1$, $R_2$, $R_3$, $R_4$, $R_5$, $R_6$, $R_7$, and $R_8$ are hydrogen or halogen atoms, alkyl, alkenyl, aryl, aralkenyl, alicyclic, aralkyl, or alkaryl radicals, or substituted derivatives thereof, such as haloalkyl, alkoxy, aryloxy, carbalkoxy, hydroxyalkyl radicals, of which at least one of the radicals $R_1$ and $R_2$ must be an alkyl, alkenyl, aralkyl, halo alkyl or alkoxy alkyl radical, and the like.

When a meta-dioxane has a substituent containing a double bond between a pair of carbon atoms, the product derived from said meta-dioxane by dehydrahydrolysis is a triolefin. Compounds containing two meta-dioxane rings free from unsaturated substituents yield tetraolefins upon dehydrahydrolysis. Hydrocarbon-substituted dioxolanes (cyclic acetals containing a five-membered ring) can also be dehydrahydrolyzed to yield conjugated polyolefins.

Examples of cyclic acetals which are capable of being converted into diolefins by the reaction of the present invention are as follows:

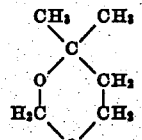

4,4-dimethyl meta-dioxane

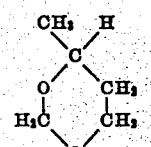

4-methyl meta-dioxane

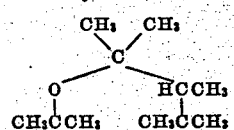

2,2,4,4,5,6,6-hepta methyl meta-dioxane

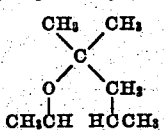

2,4,4,6-tetra methyl meta-dioxane

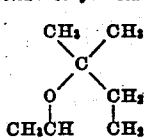

2,4,4-trimethyl meta-dioxane

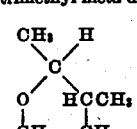

4,5-dimethyl meta-dioxane

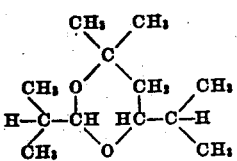

2,6-diisopropyl-4,4-dimethyl meta-dioxane

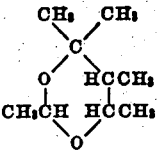

2,6-diphenyl-4,4-dimethyl meta-dioxane

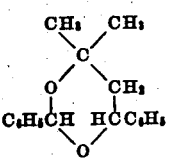

4-methyl-4-vinyl meta-dioxane

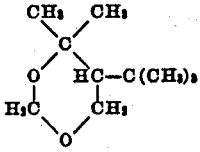

4,4,5-trimethyl meta-dioxane

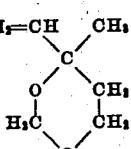

4-methyl-4-ethyl meta-dioxane

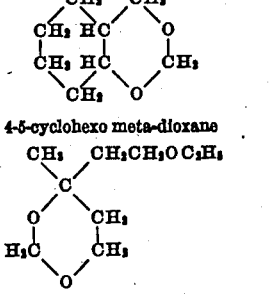

4-methyl-4-neopentyl meta-dioxane

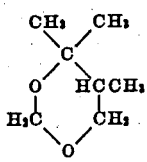

4-propyl meta-dioxane

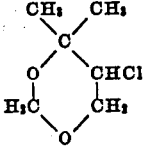

4,4-diethyl meta-dioxane

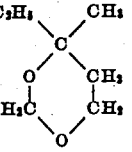

4-methyl-4-phenyl meta-dioxane

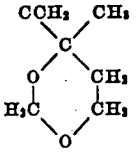

2,4,4,5,6-pentamethyl meta-dioxane

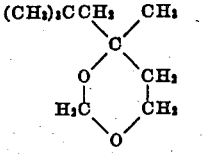

4,4-dimethyl-5-t-butyl meta-dioxane

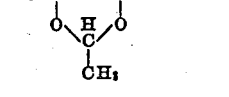

4-5-cyclohexo meta-dioxane

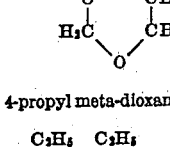

4-methyl-4-ethoxy-ethyl meta-dioxane

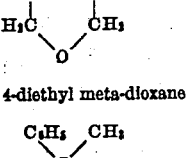

4,4-dimethyl-5-chloro meta-dioxane

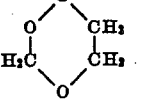

4-methyl 4-chloro-methyl meta-dioxane 2,4,4,5,5-pentamethyl dioxolane

Representative examples of the conjugated polyolefinic compounds which may be prepared by the process of the present invention are as follows:

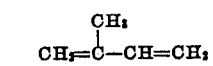

isoprene

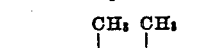

2,3-dimethylbutadiene-1,3

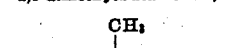

3-methylpentadiene-1,3

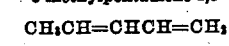

piperylene

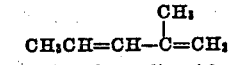

2-methylpentadiene-1,3

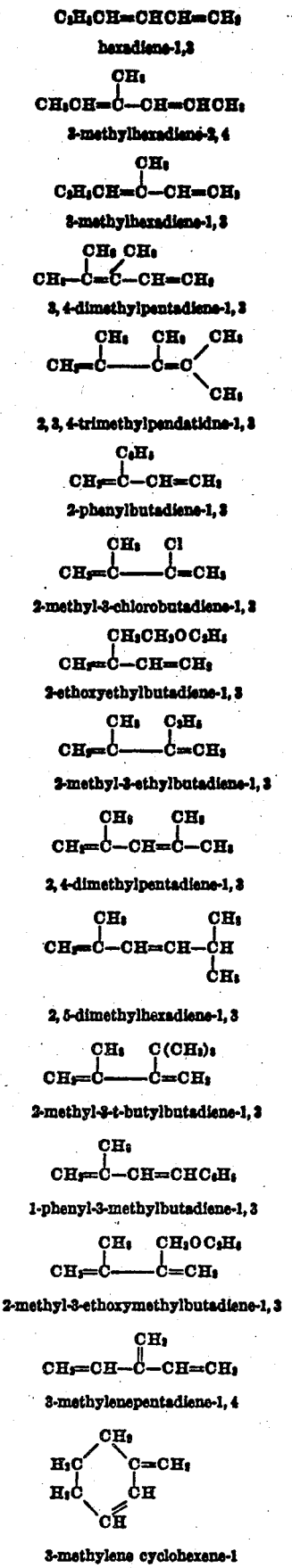

The reaction of the present invention is one of dehydrahydrolysis in which cyclic acetals are converted into the corresponding polyolefinic compounds in the presence of an acidic catalyst. This reaction may be illustrated as follows:

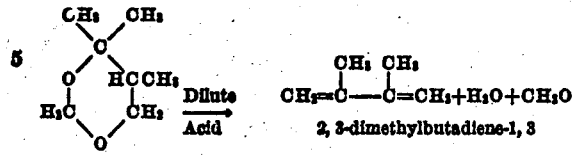

4,4,5-trimethyl meta-dioxane     2,3-dimethylbutadiene-1,3

The catalysts which are effective in promoting the reactions involved in this invention are acidic in character, and may be classified into two general groups, mineral and organic. In the mineral classification are mineral acids, mineral acid-acting compounds (e. g., mineral acid-acting salts), and other substances which are capable of acting as mineral acids in the presence of water or under the conditions of the reaction. Mineral acid catalysts include HCl, $H_2SO_4$, $HNO_3$, HBr, $H_3PO_4$, $H_2S_2O_7$, $HPO_3$, $H_4P_2O_7$, HF, $ClSO_3H$, $FSO_3H$, silicotungstic acid, boron fluoride-water complexes, fluosilicic acid, and the like. The following mineral acid-acting salt catalysts may be mentioned: $FeCl_3$, $ZnCl_2$, $ZnSO_4$, $AlCl_3$, $Fe_2(SO_4)_3$, $NaHSO_4$, $Al_2(SO_4)_3$, $NaH_2PO_4$, etc. Illustrative of the compounds which form acids with water and which may be used in the presence of water as catalysts for these reactions are $SO_2Cl_2$, $SOCl_2$, $SOBr_2$, $SO_2$, $N_2O_3$, NOCl, $PCl_3$, $PCl_5$, $POCl_3$, and $Cl_2$; for example, $Cl_2$ may be passed into a heated mixture of the meta-dioxane and water.

The organic catalysts include organic acids and organic acid salts which are capable of giving an acid reaction under the reaction conditions of the present invention. These include aliphatic carboxylic acids, such as formic and oxalic acids, halogenated organic acids, such as chloroacetic acid, aliphatic and aromatic sulfonic acids, such as hexyl and phenyl sulfonic acids, alkyl and dialkyl sulfates, such as mono- and diethyl sulfates, alkyl phosphoric acids, acid halides, sulfoacetic acid, aniline hydrochloride and hydrobromide, and the like. The cyclic acetals can also be dehydrahydrolyzed by treating a water solution thereof with a tertiary alkyl halide or another compound which decomposes to produce an acid under the reaction conditions.

Mixtures of the above catalysts may also be employed; for example, inorganic salts such as zinc chloride, calcium chloride, zinc sulfate, ammonium chloride, etc. may be added to mineral acids as reaction promoters. Such salts increase the activity of the catalyst. A mutual solvent such as ethylene glycol may be used to provide better contact between the cyclic acetal and the aqueous acid-acting catalyst. Organic acids having a relatively low hydrogen ion concentration, such as acetic acid, can be promoted ac catalysts for these reactions by adding small amounts of sulfuric acid, other mineral acids, or mineral acid salts to them.

The acid concentration of the catalyst should not exceed 50%, and may range between 0.05 and 50%. With the mineral acid catalysts, the best results are obtained with acid concentrations ranging from 1 to 5%. A decrease in the acid concentration tends to improve the diolefin yield, but results in an increased reaction time. A decrease in the volume of the aqueous catalyst per unit weight of cyclic acetal also results in an increased reaction time but, in most instances, does not affect the diolefin yield. Thus, the use of large volumes of aqueous catalyst is beneficial, since increased reaction speeds result therefrom.

Very dilute acid catalysts (0.05–1.0% concentration) can be used together with an inorganic salt as a promoter. More concentrated acid catalysts (25–50% concentration) may be used at lower reaction temperates; in such cases, the reaction may be carried out under a partial vacuum. The strong organic acids, such as chloroacetic acid, can be used either undiluted or in solution in water or a solvent such as chloroform or ethylene dichloride. In any event, a catalyst of such a nature and concentration that it will cause polymerization of polyolefins formed in this process should be avoided.

The temperature at which the reactions proceed varies between 50° and 150° C., and depends upon the acid concentration of the catalyst and the operating pressure. The pressure may range from a partial vacuum to 5 atmospheres or even higher, it being desirable to use sufficient pressure to maintain adequate contact between the cyclic acetal and the catalyst. It has been found that the reactions proceed best with tertiary meta-dioxanes at atmospheric pressure and a temperature of 90°–105° C. However, both elevated temperatures and pressures are required for the conversion of cyclic acetals in which X (see formula, page 1) is a secondary carbon atom. It has also been found that the time required for the completion of the reaction likewise depends upon the type of cyclic acetal used and the conditions of temperature and acid concentration. The time range within which the reaction is completed extends from 0.1 to 16 hours. With cyclic acetals in which X is a tertiary carbon atom, the conditions of temperature and acid concentration may be varied to bring the reaction time within the limits of from 0.1 to 8 hours. Cyclic acetals in which X is a secondary carbon atom require from 4 to 12 hours depending upon conditions of temperature and acid concentration. Dehydrahydrolysis of cyclic acetals may also be carried out at elevated temperatures and pressures in the absence of a catalyst or in the presence of a very dilute catalyst.

The process of the present invention may be carried out in either a batch or continuous fashion and in either the liquid or vapor phase. The process may be carried out in a continuous manner in one of several ways:

(1) The cyclic acetal may be added slowly to a heated reaction vessel containing the catalyst, the reaction mixture being agitated to provide good contact between the cyclic acetal and catalyst, and the polyolefin being fractionated off as formed. The condensate is then dried over potassium carbonate or other dessicating salt and refractionated. An aldehyde is a by-product of the reaction. If desired, sulfur dioxide, sodium bisulfite, a tertiary alcohol, a tertiary olefin, or a tertiary halide may be charged to the reactor simultaneously with the cyclic acetal to unite with the liberated aldehyde and thus prevent the polymerization of the aldehyde or side reactions between the aldehyde and the diolefin before the removal of the latter from the reaction system. The aldehyde may also be distilled from the reactor along with the poly-olefin.

(2) The cyclic acetal and dilute acid-acting catalyst may be passed through a heated, packed reactor either in concurrent or countercurrent direction, the resulting diolefin being separated from the reaction mixture by fractionation, and any unreacted materials being recycled to the reactor.

(3) The cyclic acetal may be passed together with steam over an acid catalyst deposited on a carrier or over solid acid-acting salt at elevated temperatures. The poly-olefinic products of these reactions may be purified by refractionation. The dehydrahydrolysis of cyclic acetals formed from formaldehyde yields reaction distillates containing almost pure poly-olefins. Distillates obtained during the dehydrahydrolysis of cyclic acetals formed from higher molecular weight aldehydes than formaldehyde usually contain both the aldehyde and the poly-olefin. The aldehyde and polyolefin may be separated from each other by fractionation of the distillates containing them; the aldehyde may be recycled by converting it into a cyclic acetal which can then be treated according to the process of this invention. By-products formed in these reactions may be recycled, if desired, or may be used as such in further synthesis, as solvents, or as blending agents for gasoline, etc.

Cyclic acetals suitable as starting materials for this process may be prepared by the condensation of olefins (see copending application Serial No. 334,668; filed May 11, 1940), other unsaturated compounds, or secondary or tertiary alcohols with aldehydes in the presence of dilute mineral acids. When it is desired to produce poly-olefins from meta-dioxanes obtained according to the method disclosed in copending application Serial No. 334,668 referred to above, it is not necessary to isolate the meta-dioxanes; instead, the olefin-aldehyde reaction mixtures containing them may be diluted with water to the desired acid concentration, and the diluted mixtures may then be refluxed under fractionation conditions, the poly-olefinic products being taken off overhead as formed. Cyclic acetals may also be prepared by condensing glycols or other polyhydric alcohols with aldehydes.

The importance of this invention may be realized when it is pointed out that only meager poly-olefin yields are obtained when cyclic acetals are heated with a dilute acid catalyst under such conditions that none of the reaction products are removed from the reaction zone until completion of the reaction. Only when the poly-olefin is removed continuously (by distillation) as it is formed are satisfactory poly-olefin yields attained. The refluxing feature of this invention insures contact of the cyclic acetal with the acidic catalyst at a readily controlled temperature for a period sufficient for the complete conversion of the cyclic acetal. Thus, whether the process of this invention be applied to cyclic acetals per se or to olefin-aldehyde reaction mixtures containing cyclic acetals, this invention represents a distinct and advantageous advance over period art methods for producing poly-olefins.

The conjugated poly-olefins made in accordance with this invention are useful in the preparation of synthetic rubbers, as intermediates in other chemical reactions, and as blending agents for gasoline. For example, 2,3-dimethylbutadiene has an octane blending value of 212.

The following examples are given for the purpose of illustrating the invention:

*Example 1*

260 parts by weight of 4,4,5-trimethyl meta-dioxane (boiling point: 152° C.), and 1240 parts by weight of 5% sulfuric acid were placed in a reactor equipped with a stirrer and a fractionating tower. The mixture was stirred and heated to a temperature of between 95° and 100° C., at which temperature the reaction started. The fractionating tower temperature was maintained between 60° and 63° C. until all of the diolefin formed in the reaction was removed (5 hours); the complete removal of the diolefin was indicated by a sudden rise in the fractionating tower temperature. The distillate from the fractionator was composed of 74.4 parts by weight of 2,3-dimethylbutadine-1,3 and 68 parts by weight of water. The 2,3-dimethylbutadiene-1,3 was purified by refractionation. The pure diolefin boiled at 68.5 C. (756 mm.); the product of its reaction with maleic anhydride melted at 78°–78.5° C.

Example 2

260 parts by weight of 4,4,5-trimethyl metadioxane and 1215 parts by weight of 2.5% HCl were charged into a reactor equipped as in Example 1. The mixture was then heated at 94°–97° C. under fractionation conditions for 4 hours as in Example 1. The distillate was purified, yielding 79 parts by weight of 2,3-dimethylbutadiene-1,3.

Example 3

260 parts by weight of 4,4,5-trimethyl metadioxane and 1520 parts by weight of 42% phosphoric acid were placed in a reactor equipped as in Example 1, and were heated to a temperature of between 98° and 102° C. for one hour. The fractionating tower temperature was maintained between 62° and 65° C. Purification of the distillate yielded 37 parts by weight of 2,3-dimethylbutadiene-1,3.

Example 4

260 parts by weight of 4,4,5-trimethyl metadioxane and 1220 parts by weight of 2.5% hydrobromic acid were heated for 8 hours at 95°–97° C. in accordance with the method described in Example 1. The purified distillate was composed of 77.0 parts by weight of 2,3-dimethylbutadiene-1,3.

Example 5

260 parts by weight of 4,4,5-trimethyl metadioxane and 1215 parts by weight of 2.5% nitric acid were heated for 7 hours at 95°–97° C. in accordance with the method described in Example 1, yielding 69 parts by weight of 2,3-dimethylbutadiene-1,3.

Example 6

100 parts by weight of 4,4,5-trimethyl metadioxane and 157 parts by weight of dichloroacetic acid were heated for 40 minutes at the refluxing temperature of the mixture in accordance with the method described in Example 1, yielding 15 parts by weight of 2,3-dimethylbutadiene-1,3.

Example 7

260 parts by weight of 4,4,5-trimethyl metadioxane and 1200 parts by weight of a 0.2% HCl solution containing 360 parts by weight of calcium chloride yielded 85 parts by weight of 2,3-dimethylbutadiene-1,3 on being heated for 5 hours at 99°–101° C. in accordance with the method described in Example 1.

Example 8

260 parts by weight of 4,4,5-trimethyl metadioxane and 1400 parts by weight of 2.5% HCl in 85% ethylene glycol were heated for one hour at a temperature of 96° to 100° C. in accordance with the method described in Example 1, the tower temperature being maintained between 58° and 61° C., to produce 62 parts by weight of 2,3-dimethylbutadiene-1,3.

Example 9

120 parts by weight of paraformaldehyde, 118 parts by weight of 25% sulfuric acid, and 246 parts by weight of trimethylethylene were placed in a closed container, and the whole was shaken for 5–6 hours. The formaldehyde reacted completely. The reaction product was diluted with 475 parts of water, and the diluted mixture was stirred and heated under fractionation conditions at a temperature of 95°–99° C. for 7 hours. The distillate was taken overhead at 64° C. until the reaction terminated and then the fractionation was continued until the head temperature reached 83° C. The distillate was dried over $K_2CO_3$ and fractionated, 94 parts by weight of trimethylethylene boiling at 26°–41° C., 2.3 parts by weight of a mixture of trimethylethylene and 2,3-dimethylbutadiene-1,3 boiling at 41°–65° C., and 54 parts by weight of 2,3-dimethylbutadiene-1,3 boiling at 65°–73° C. being obtained thereby.

Example 10

232 parts by weight of 4,4-dimethyl meta-dioxane (boiling point: 131°–133° C.) and 1070 parts by weight of 2.5% HCl were heated for 3.5 hours in accordance with the method described in Example 1, the reactor temperature being 93–100° C. and the fractionating tower temperature being 40°–42° C. The reaction yielded 55 parts by weight of isoprene (2-methyl-butadiene-1,3) boiling at 33.9° C. (756 mm.); the product of its reaction with maleic anhydride melted at 64° C.

Example 11

196 parts by weight of 2,4,4,6-tetramethyl meta-dioxane (boiling point: 138°–140° C.) and 960 parts by weight of 2.5% HCl were heated for 2.5 hours in accordance with the method described in Example 1, the reactor temperature being 90°–96° C. and the fractionating tower temperature being 56–63° C. Purification of the distillate yielded 37 parts by weight of 2-methylpentadiene-1,3 (boiling point: 75° C.; melting point of its maleic anhydride addition product: 58°–58.5° C.) and 25 parts by weight of acetaldehyde.

Example 12

170 parts by weight of 2,4,4,5,6-pentamethyl meta-dioxane (boiling point: 160°–162.5° C.) and 820 parts by weight of 2.5% HCl were heated for 2.25 hours at 89°–95° C. in accordance with the method described in Example 1, the fractionating tower temperature being 63°–70° C. Upon purification of the distillate, 35 parts by weight of 2,3-dimethylpentadiene-1,3 (boiling point: 105°–106° C. at 756 mm.; melting point of its maleic anhydride addition product: 80°–80.5° C.) were obtained.

We claim:

1. A process for the production of 2,3-dimethylbutadiene-1,3 which comprises refluxing 4,4,5-trimethyl meta-dioxane for from 0.1 to 8 hours with 1–5% sulfuric acid and removing the 2,3-dimethyl-butadiene-1,3 as formed.

2. A process for the production of isoprene which comprises refluxing 4,4-dimethyl meta-dioxane for from 0.1 to 8 hours with 1–5% sulfuric acid and removing the isoprene as formed.

3. A process for the production of 2-methylpentadiene-1,3 which comprises refluxing 2,4,4,6-tetramethyl meta-dioxane for from 0.1 to 8 hours with 1-5% sulfuric acid and removing the 2-methyl-pentadiene-1,3 as formed.

4. A process for the production of 2,3-dimethylbutadiene-1,3 which consists in reacting para-formaldehyde, 25% sulfuric acid and trimethylethylene in a closed container for six hours, diluting the reaction mixture with water to an acid concentration of 5% and heating the diluted mixture under reflux conditions at a temperature of 95°-99° C. while taking overhead a distillate between the temperatures of 64° C. and 83° C., drying and fractionating the distillate to recover the 2,3-dimethylbutadiene-1,3.

5. A process for the production of 2,3-dimethylbutadiene-1,3 which consists in reacting 120 parts by weight of para-formaldehyde, 118 parts by weight of 25% sulfuric acid and 246 parts by weight of trimethylethylene in a closed container for 6 hours, diluting the reaction mixture with 475 parts of water and heating the diluted mixture under reflux conditions at a temperature of 95°-99° C. for 7 hours while taking overhead a distillate between the temperatures of 64° C. and 83° C., drying and fractionating the distillate to recover the 2,3-dimethylbutadiene-1,3.

6. A process for the production of conjugated polyolefin which comprises refluxing a cyclic acetal possessing the formula—

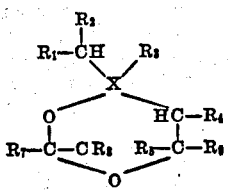

wherein X is a carbon atom selected from the group consisting of secondary and tertiary carbon atoms; $R_1$, $R_2$, $R_3$, $R_4$, $R_5$, $R_6$, $R_7$ and $R_8$ are substituents selected from the group consisting of hydrogen and halogen atoms, alkyl, alkenyl, aryl, aralkenyl, alicyclic, aralkyl, alkaryl, halo-alkyl, alkoxy, aryloxy, carbalkoxy and hydroxy alkyl radicals for from 0.1 to 16 hours with an aqueous acid-reacting material having an acid concentration of 0.05-50%, at a temperature between 50° and 150° C. and removing the polyolefin as formed.

7. A process for the production of conjugated polyolefin which comprises refluxing a cyclic acetal possessing the formula—

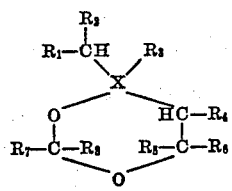

wherein X is a carbon atom selected from the group consisting of secondary and tertiary carbon atoms; $R_1$, $R_2$, $R_3$, $R_4$, $R_5$, $R_6$, $R_7$ and $R_8$ are substituents selected from the group consisting of hydrogen and halogen atoms, alkyl, alkenyl, aryl, aralkenyl, alicyclic, aralkyl, alkaryl, halo-alkyl, alkoxy, aryloxy, carbalkoxy and hydroxy alkyl radicals for from 0.1 to 16 hours with an aqueous acid-reacting material having an acid concentration of 0.05-50%, at a temperature between 50° and 150° C., under a pressure ranging from a partial vacuum to several atmospheres and removing the poly-olefins as formed.

8. A process for the production of conjugated poly-olefins which comprises refluxing a cyclic acetal possessing the formula—

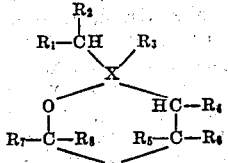

wherein X is a tertiary carbon atom, $R_3$ is a substituent selected from the group consisting of alkyl, alkenyl, aryl, aralkenyl, alicyclic, aralkyl, alkaryl, halo-alkyl, alkoxy, aryloxy, carbalkoxy and hydroxy alkyl radicals, and $R_1$, $R_2$, $R_4$, $R_5$, $R_6$, $R_7$, and $R_8$ are substituents selected from the group consisting of hydrogen and halogen atoms, alkyl, alkenyl, aryl, aralkenyl, alicyclic, aralkyl, alkaryl, halo-alkyl, alkoxy, aryloxy, carbalkoxy and hydroxy alkyl radicals for from 0.1 to 8 hours with an aqueous acid reacting material having an acid concentration of 0.05-50% at a temperature between 90° and 150° C. under a pressure ranging from a partial vacuum to several atmospheres and removing the poly-olefins as formed.

9. The process as defined in claim 7 in which the cyclic acetal is refluxed for from 0.1 to 12 hours and the aqueous acid-reacting material is dilute aqueous hydrochloric acid having an acid concentration of 1-5%.

10. A process for the production of a conjugated diene which comprises refluxing a cyclic acetal, possessing the formula—

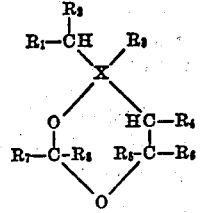

wherein X is a carbon atom selected from the group consisting of secondary and tertiary carbon atoms; $R_1$, $R_2$, $R_3$, $R_4$, $R_5$, $R_6$, $R_7$ and $R_8$ are substituents selected from the group consisting of hydrogen and halogen atoms, alkyl, alkenyl, aryl, aralkenyl, alicyclic, aralkyl, alkaryl, halo-alkyl, alkoxy, aryloxy, carbalkoxy and hydroxy alkyl radicals for from 0.1 to 12 hours with an aqueous acid-reacting material having an acid concentration of 1-5% and a catalyst promoter selected from the group consisting of inorganic chlorides, sulfates and phosphates, at a temperature between 50° and 150° C., under a pressure ranging from partial vacuum to several atmospheres, and removing the diene as formed.

11. A process for the production of conjugated diene which comprises refluxing a cyclic acetal possessing the formula—

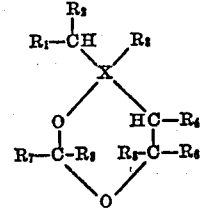

wherein X is a carbon atom selected from the group consisting of secondary and tertiary carbon atoms; $R_1$, $R_2$, $R_3$, $R_4$, $R_5$, $R_6$, $R_7$ and $R_8$ are substituents selected from the group consisting of hydrogen and halogen atoms, alkyl, alkenyl, aryl, aralkenyl, alicyclic, aralkyl, alkaryl, haloalkyl, alkoxy, aryloxy, carbalkoxy and hydroxy alkyl radicals for from 0.1 to 12 hours with an aqueous acid-reacting material having an acid concentration of 1-5% and a mutual solvent at a temperature between 50 and 150° C. under a pressure ranging from partial vacuum to several atmospheres and removing the diene as formed.

12. The process as defined in claim 8 in which the aqueous acid-reacting material has an acid concentration of 1-5%, temperature is between 90° and 105° C. and the pressure is atmospheric pressure.

LOUIS A. MIKESKA.
ERVING ARUNDALE.